(12) United States Patent
Paolini et al.

(10) Patent No.: US 10,611,490 B2
(45) Date of Patent: Apr. 7, 2020

(54) FAN COWL FAIRING RESTRAINING SYSTEM

(71) Applicant: Rohr, Inc., Chula Vista, AZ (US)

(72) Inventors: Thomas Paolini, Santee, CA (US); Marc Schommer, San Diego, CA (US)

(73) Assignee: Rohr, Inc., Chula Vista, AZ (US)

( * ) Notice: Subject to any disclaimer, the term of this patent is extended or adjusted under 35 U.S.C. 154(b) by 339 days.

(21) Appl. No.: 15/341,705

(22) Filed: Nov. 2, 2016

(65) Prior Publication Data
US 2018/0118359 A1    May 3, 2018

(51) Int. Cl.
*B64D 29/06*    (2006.01)
*B64D 27/16*    (2006.01)

(52) U.S. Cl.
CPC .............. *B64D 29/06* (2013.01); *B64D 27/16* (2013.01)

(58) Field of Classification Search
CPC ............ B64D 29/02; B64D 29/06; B64C 7/02
See application file for complete search history.

(56) References Cited

U.S. PATENT DOCUMENTS

| | | | |
|---|---|---|---|
| 2,564,530 A * | 8/1951 | Guery ................... | B64D 29/06 123/41.7 |
| 4,150,802 A * | 4/1979 | Evelyn ................... | B64D 29/00 244/54 |
| 4,174,609 A | 11/1979 | Legrand | |
| 4,549,708 A * | 10/1985 | Norris ................... | B64D 29/06 244/129.4 |
| 5,046,689 A | 9/1991 | Shine | |
| 5,136,839 A * | 8/1992 | Armstrong ............ | B64D 29/00 244/55 |
| 6,032,901 A | 3/2000 | Carimali | |
| 8,939,398 B2 | 1/2015 | Letay | |
| 9,004,855 B2 * | 4/2015 | Vauchel ................. | B64D 29/08 415/126 |
| 2010/0176250 A1 * | 7/2010 | Porte ..................... | B64D 27/18 244/53 B |
| 2015/0284100 A1 * | 10/2015 | Bonneau ............... | B64D 29/06 415/214.1 |
| 2015/0369083 A1 | 12/2015 | Mercier | |
| 2017/0247929 A1 * | 8/2017 | Lombrozo ............ | E05F 15/627 |

* cited by examiner

*Primary Examiner* — Christopher D Hutchens
(74) *Attorney, Agent, or Firm* — Snell & Wilmer, L.L.P.

(57) ABSTRACT

A nacelle tensioning arrangement may comprise a fairing located between a first fan cowl and a second fan cowl, and a flexible tensioning system configured to restrain at least a portion of the fairing from moving in a radial direction in response to at least one of the first fan cowl and the second fan cowl being in a closed position.

20 Claims, 10 Drawing Sheets

FAN COWL FAIRING RESTRAINING SYSTEM

FIELD

The present disclosure relates to aircraft engine cowlings, and more particularly to a cowling restraining system for an aircraft nacelle.

BACKGROUND

A nacelle for a turbine engine typically includes an inlet section, a fan cowl section, a thrust reverser section, and an exhaust section. The nacelle is typically mounted to a wing or a fuselage of an aircraft via a pylon. The fan cowl section is typically split into two halves comprising fan cowls. The fan cowls typically interface with a forward secondary structure (FSS) which extends from the pylon or fan cowl support beam (FCSB).

SUMMARY

A nacelle tensioning arrangement is disclosed herein. A nacelle tensioning arrangement may comprise a fairing located between a first fan cowl and a second fan cowl, and a flexible tensioning system configured to restrain at least a portion of the fairing from moving in a radial direction in response to at least one of the first fan cowl and the second fan cowl being in a closed position.

In various embodiments, the flexible tensioning system may comprise a cable, a cable guidance system, a first cable attachment member, and a second cable attachment member. The first cable attachment member may be configured to be coupled to the first fan cowl and the second cable attachment member may be configured to be coupled to the second fan cowl, the cable guidance system being configured to be coupled to a forward edge of the fairing via a hinge beam stirrup, and the cable being configured to extend between the first cable attachment member and the second cable attachment member, via the cable guidance system. An aft edge of the fairing may be mounted to a pylon. A first end of the cable may be coupled to the first cable attachment member and a second end of the cable may be coupled to the second cable attachment member, the first end of the cable configured to wrap around the first cable attachment member in response to the first fan cowl moving to the closed position, and the second end of the cable configured to wrap around the second cable attachment member in response to the second fan cowl moving to the closed position. The cable guidance system may comprise a plurality of rollers coupled to the forward edge of the fairing. The cable guidance system may further comprise a roller coupled to an aft edge of a nacelle inlet, the roller located radially inward from the plurality of rollers coupled to the forward edge of the fairing. The flexible tensioning system may comprise a first cable, a second cable, a first cable attachment member coupled to a first hinge of the first fan cowl, and a second cable attachment member coupled to a second hinge of the second fan cowl, wherein the first cable is coupled between the first cable attachment member and the fairing, and the second cable is coupled between the second cable attachment member and the fairing.

A nacelle for a turbine engine is disclosed herein. A nacelle for a turbine engine may comprise a first fan cowl, a second fan cowl, a fairing located between the first fan cowl and the second fan cowl, and a flexible tensioning system coupled between the first fan cowl, a forward edge of the fairing, and the second fan cowl, wherein the flexible tensioning system provides tension between the first fan cowl, the forward edge of the fairing, and the second fan cowl.

In various embodiments, the flexible tensioning system may provide the tension in response to at least one of the first fan cowl and the second fan cowl rotating to a closed position. An aft edge of the fairing may be mounted to a pylon. The flexible tensioning system may comprise a cable, a cable guidance system, a first cable attachment member, and a second cable attachment member. The first cable attachment member may be configured to be coupled to the first fan cowl and the second cable attachment member is configured to be coupled to the second fan cowl, the cable guidance system being configured to be coupled to the forward edge of the fairing, and the cable being configured to extend between the first cable attachment member and the second cable attachment member, via the cable guidance system. A first end of the cable may be coupled to the first cable attachment member and a second end of the cable is coupled to the second cable attachment member, the first end of the cable being configured to wrap around the first cable attachment member in response to the first fan cowl moving to the closed position, and the second end of the cable being configured to wrap around the second cable attachment member in response to the second fan cowl moving to the closed position. The cable guidance system may comprise a plurality of rollers coupled to the forward edge of the fairing. The nacelle may further comprise a nacelle inlet located forward of the fairing, the first fan cowl, and the second fan cowl. The cable guidance system may further comprise a roller coupled to an aft edge of the nacelle inlet, the roller located radially inward from the plurality of rollers coupled to the forward edge of the fairing. The flexible tensioning system may comprise a first cable, a second cable, a first cable attachment member coupled to the first fan cowl, and a second cable attachment member coupled to the second fan cowl, wherein the first cable is coupled between the first cable attachment member and the fairing, and the second cable is coupled between the second cable attachment member and the fairing.

A method for restraining a forward edge of a nacelle is disclosed herein. A method for restraining a forward edge of a nacelle fairing may comprise rotating a fan cowl from an open position to a closed position, and generating tension, via a flexible tensioning system, between the nacelle fairing and the fan cowl, in response to the rotation.

In various embodiments, the method may further comprise wrapping a cable around a cable attachment member in response to the rotation, the flexible tensioning system comprising the cable, and the cable attachment member coupled to a hinge of the fan cowl.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by refer

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading and/or crosshatching lines may be used throughout the figures to denote different parts, but not necessarily to denote the same or different materials.

Figure 1:
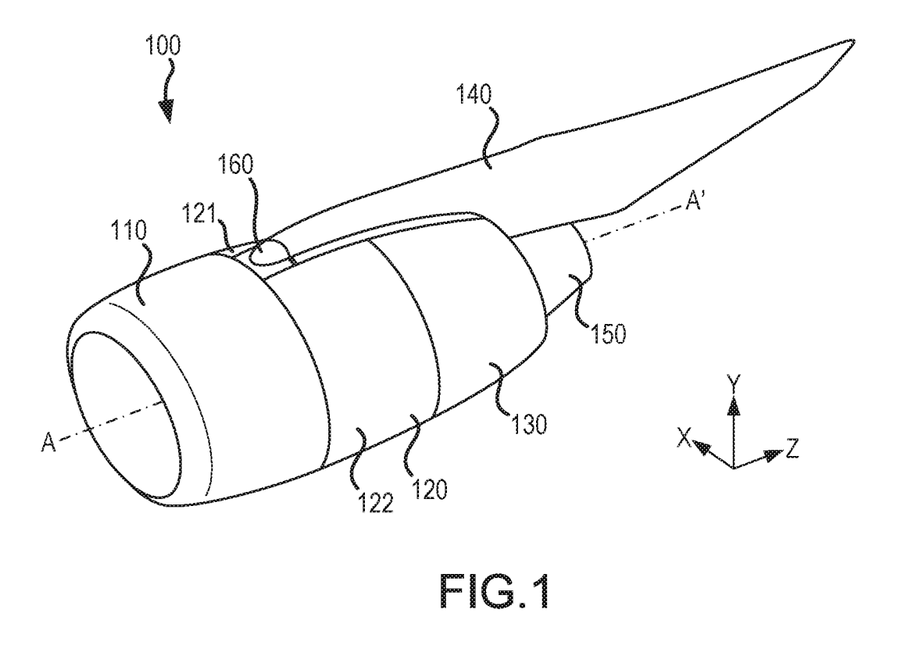
- FIG. 1 illustrates a perspective view of an aircraft nacelle with a fairing, in accordance with various embodiments.

With respect to FIG. 2 through FIG. 7E, elements with like element numbering, as depicted in FIG. 1, are intended to be the same and will not necessarily be repeated for the sake of clarity.

A nacelle for a turbine engine typically includes an inlet section, a fan cowl section, a thrust reverser section, and an exhaust section. The nacelle is typically mounted to a wing or a fuselage of an aircraft via a pylon. The fan cowl section is typically split into two halves comprising fan cowls. The fan cowls typically interface with a forward secondary structure (FSS), or fairing, which extends from the pylon or fan cowl support beam (FCSB).

The flexible tensioning system of the present application may restrain or prevent deflection of portions of the fairing in the radially outward direction. Such deflection is a phenomenon also referred to as "scooping," which is exacerbated by the fact that the forward edge of the fairing may not be directly radially supported, but instead may be cantilevered from a structure it is attached to, such as a pylon. Restraining the fairing may increase aerodynamic performance of the nacelle and increase the integrity of the fairing.

With reference to FIG. 1, a nacelle 100 for a gas turbine engine is illustrated according to various embodiments. Nacelle 100 may be suitable for an aircraft. Nacelle 100 may comprise a centerline A-A'. Nacelle 100 may comprise an inlet 110, a fan cowl 120, and a thrust reverser 130. Fan cowl 120 may comprise two halves pivotally mounted to pylon 140, via one or more hinges. In this regard, fan cowl 120 may comprise a first fan cowl 121 (also referred to herein as a right-hand (RH) fan cowl) and a second fan cowl 122 (also referred to herein as a left-hand (LH) fan cowl). In various embodiments, first fan cowl 121 may comprise multiple hinges, for example four hinges referred to as hinge 1 RH, hinge 2 RH, hinge 3 RH, and hinge 4 RH, where hinge 1 RH is located at the forward side of first fan cowl 121 and hinge 4 RH is located at the aft side of first fan cowl 121. In various embodiments, second fan cowl 122 may comprise multiple hinges, for example four hinges referred to as hinge 1 LH, hinge 2 LH, hinge 3 LH, and hinge 4 LH, wherein hinge 1 LH is located at the forward side of second fan cowl 122 and hinge 4 LH is located at the aft side of second fan cowl 122.

In various embodiments, an exhaust nozzle 150 may extend from a turbine engine mounted within nacelle 100. Nacelle 100 may be coupled to a pylon 140, which may mount the nacelle 100 to an aircraft wing or aircraft body. Nacelle 100 may comprise a fairing 160. In various embodiments, fairing 160 may comprise a forward secondary structure (FSS). Fairing 160 may be mounted to pylon 140 and extend forward towards inlet 110. Fairing 160 may comprise a nacelle fairing. Fairing 160 may be located between first fan cowl 121 and a second fan cowl 122. Stated another way, fairing 160 may be circumferentially disposed between first fan cowl 121 and a second fan cowl 122, within an axial plane.

Figure 2:
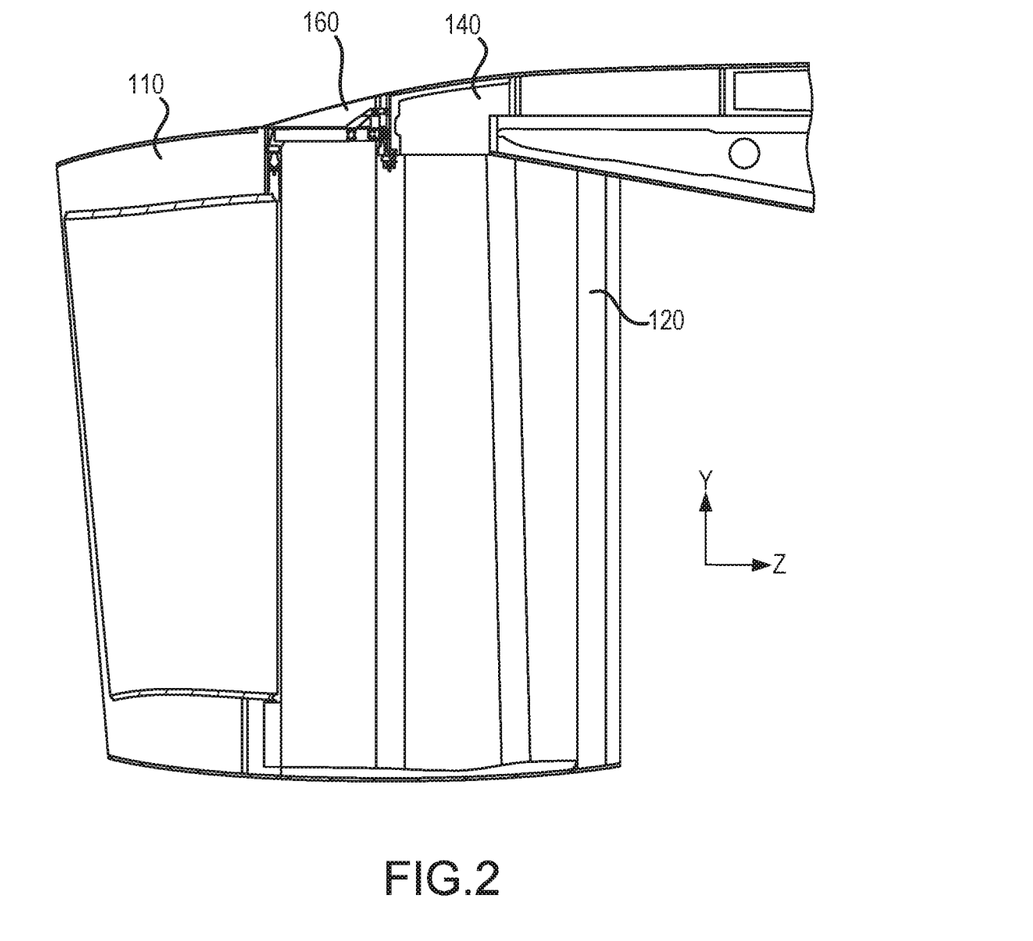
FIG. 2 illustrates a cross-section side view of an aircraft nacelle with a fairing, in accordance with various embodiments.

With reference to FIG. 2, a cross-section view of inlet 110, fairing 160, fan cowl 120, and a portion of pylon 140 is illustrated, in accordance with various embodiments.

Figure 3:
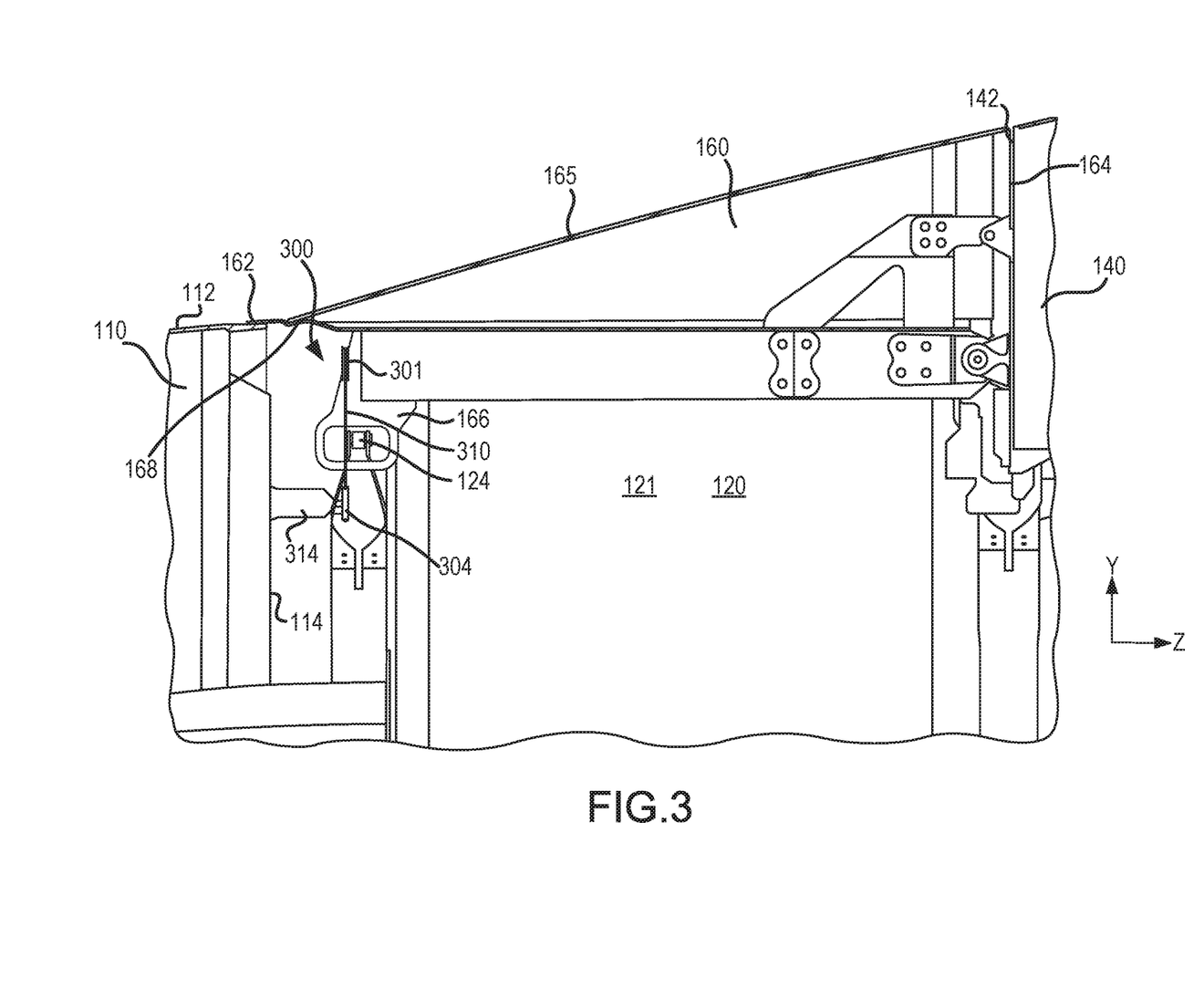
FIG. 3 illustrates a cross-section side view of the fairing of FIG. 2 coupled to an inlet, a first fan cowl, and a second fan cowl, via a flexible tensioning system, in accordance with various embodiments.

With reference to FIG. 3, a closer view of the fairing 160 of FIG. 2 is illustrated, in accordance with various embodiments. Fairing 160 may define an aerodynamic surface 165 of nacelle 100. Fairing 160 may be coupled to pylon 140. Aft edge 164 of fairing 160 may be coupled to forward edge 142 of pylon 140. A forward lip 162 of fairing 160 may overlap a radially outer surface 112 of inlet 110. Radially outer surface 112 may define an aerodynamic surface of nacelle 100. Fairing 160 may comprise a stirrup 166 extending radially inward from fairing 160. A hinge beam 124 may extend through stirrup 166. Stirrup 166 may comprise a support for hinge beam 124. Fairing 160 may comprise a stirrup 167 extending radially inward from fairing 160. Hinge beam 124 may extend through stirrup 167. Stirrup 167 may comprise a support for hinge beam 124.

In various embodiments, a flexible tensioning system 300 may be coupled between first fan cowl 121, fairing 160, inlet 110, and second fan cowl 122, with momentary reference to FIG. 1. It should be noted that second fan cowl 122 is not illustrated in FIG. 3 since FIG. 3 is a side cross-section view of nacelle 100.

Figure 4:
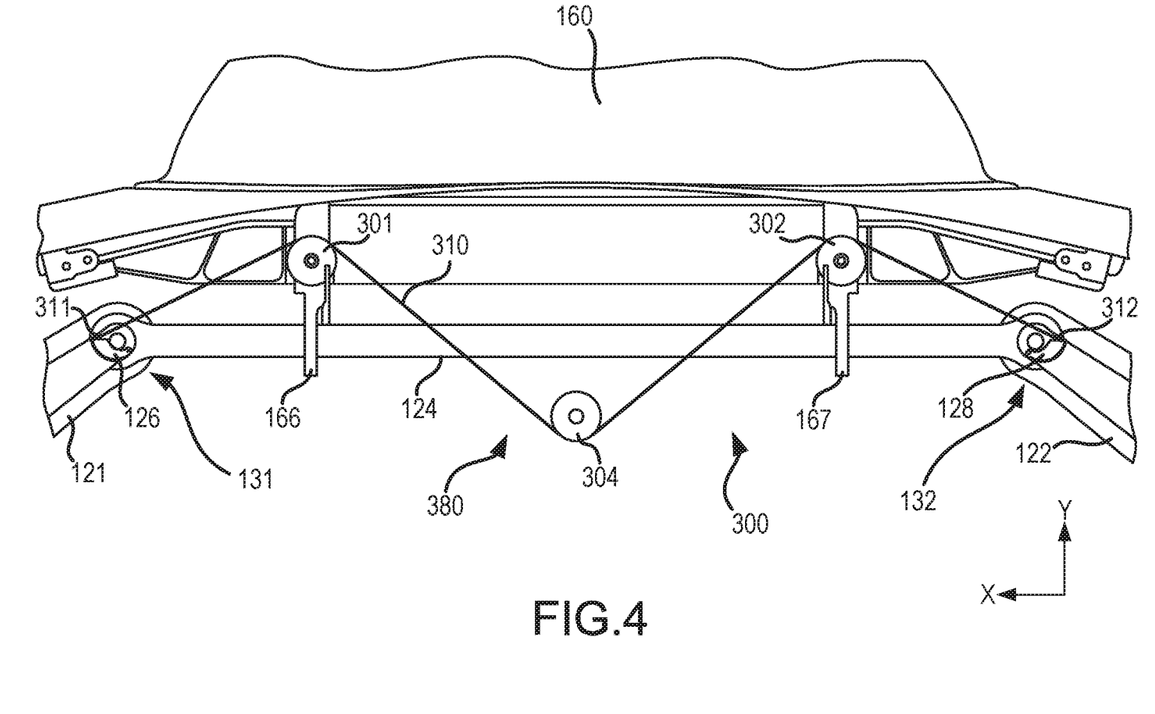
FIG. 4 illustrates a cross-section axial, forward looking aft view of the flexible tensioning system of FIG. 3, with the first fan cowl and a second fan cowl in closed positions, in accordance with various embodiments.
Figure 5:
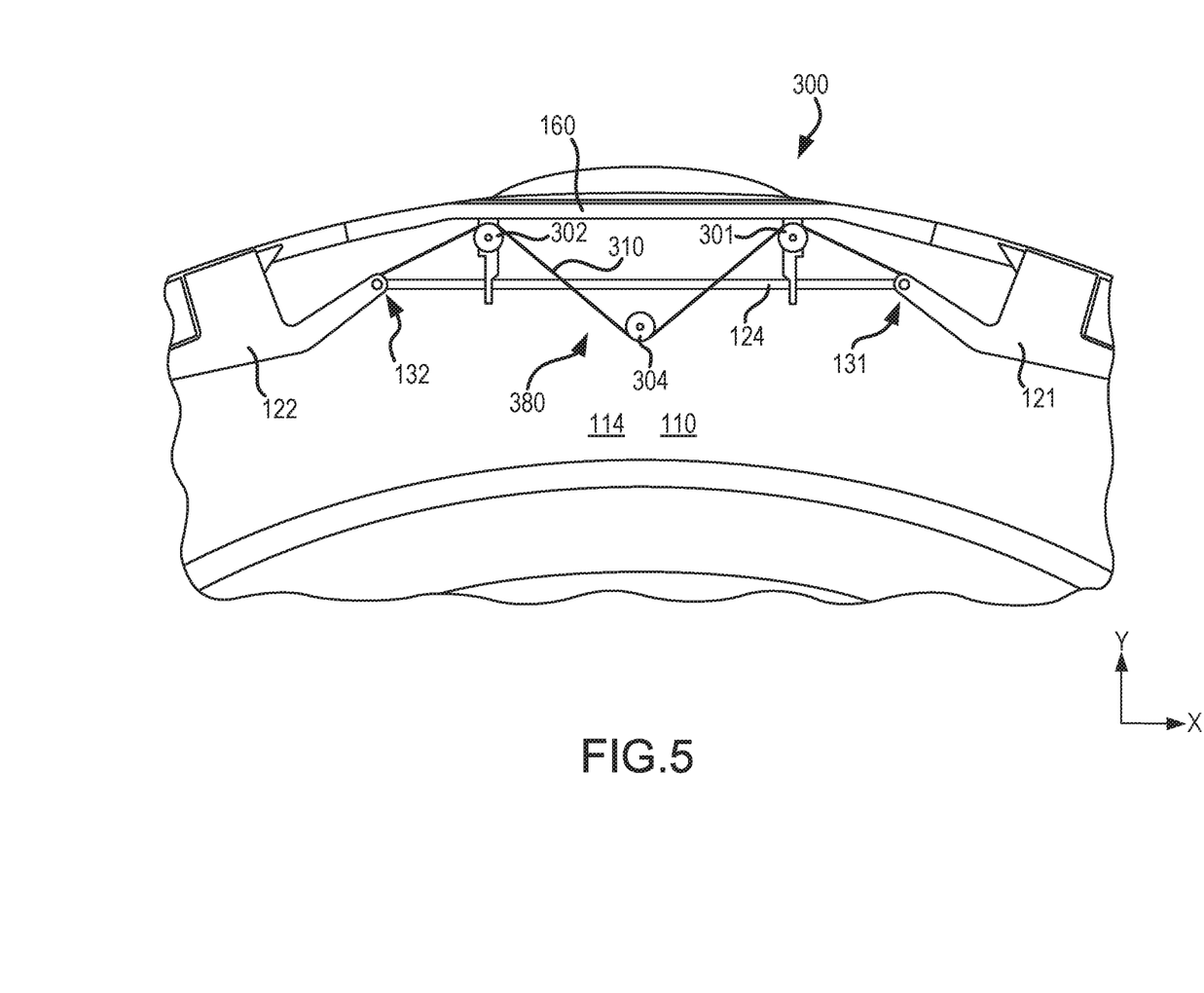
FIG. 5 illustrates a cross-section axial, aft looking forward view of the flexible tensioning system of FIG. 3, with the first fan cowl and a second fan cowl in closed positions, in accordance with various embodiments.

With combined reference to FIG. 3 through FIG. 5, flexible tensioning system 300 may comprise a cable guidance system 380. In various embodiments, cable guidance system 380 may comprise a plurality of rollers, including roller 301 and roller 302. Roller 301 and roller 302 may be rotatably coupled to fairing 160. In various embodiments, roller 301 may be rotatably coupled to stirrup 166 of fairing 160. In various embodiments, roller 302 may be rotatably coupled to stirrup 166 of fairing 160. Roller 301 and roller 302 may be rotatably coupled to forward edge 168 of fairing 160, via stirrup 166. Cable guidance system 380 may comprise roller 304. Roller 304 may be rotatably coupled to inlet 110. Roller 304 may be rotatably coupled to inlet 110 via bracket 314. Roller 304 may be located radially inward from roller 301 and roller 302. In this configuration, a component of the tension in cable 310 is directed in a radial direction to prevent the forward edge of fairing 160 from moving radially outward.

In various embodiments, flexible tensioning system 300 may comprise cable 310, first cable attachment member 126, and second cable attachment member 128. Cable 310 may extend between first cable attachment member 126 and a second cable attachment member 128, via cable guidance system 380. A first end 311 of cable 310 may be coupled to first cable attachment member 126. A second end 312 of cable 310 may be coupled to second cable attachment member 128. First cable attachment member 126 may be coupled to first hinge (also referred to herein as hinge 1 RH) 131 of first fan cowl 121. Second cable attachment member 128 may be coupled to second hinge (also referred to herein as hinge 1 LH) 131 of second fan cowl 122. Flexible tensioning system 300 may be coupled between first fan cowl 121, forward edge 168 of fairing 160, inlet 110, and second fan cowl 122. Cable 310 may extend from first cable attachment member 126, radially outward of roller 301, radially inward of roller 304, radially outward of roller 302, and to second cable attachment member 128.

Figure 6:
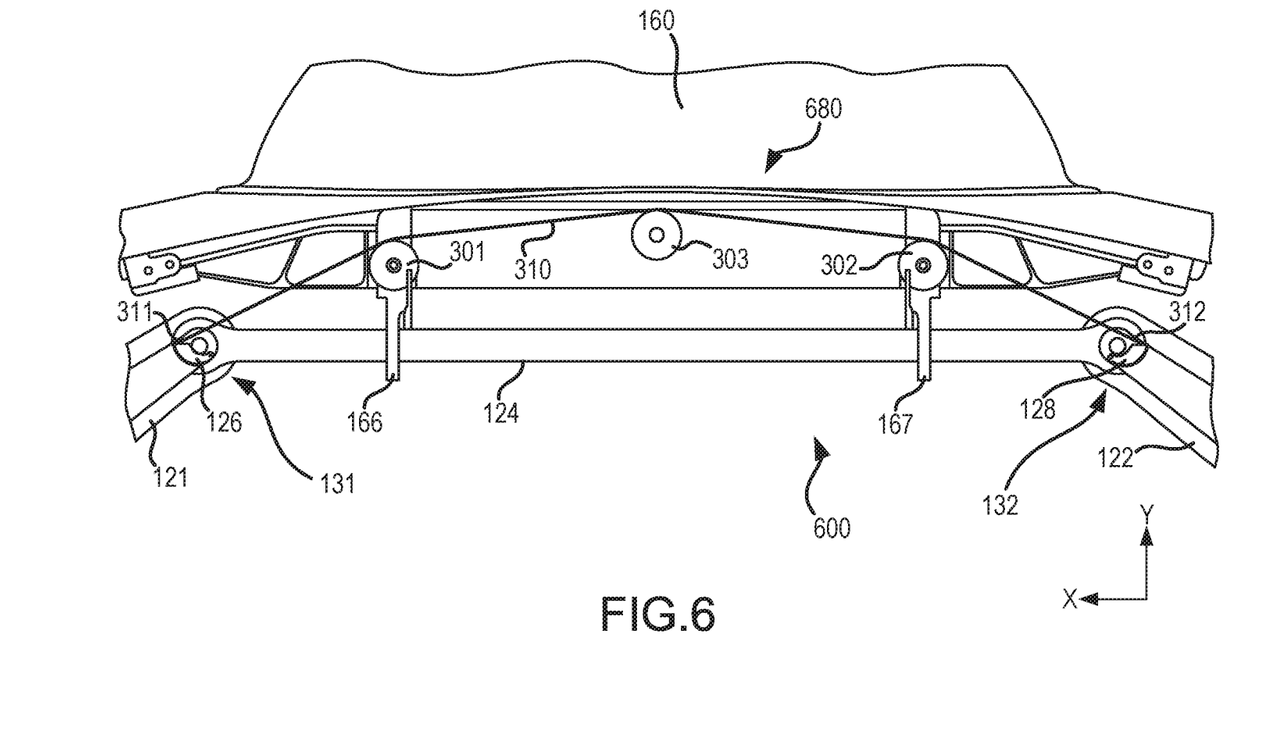
FIG. 6 illustrates a cross-section axial, forward looking aft, view of a flexible tensioning system coupled between a first fan cowl, a fairing, and a second fan cowl, in accordance with various embodiments.

With reference to FIG. 6, a flexible tensioning system 600 is illustrated, in accordance with various embodiments. Flexible tensioning system 600 may be similar to flexible tensioning system 300 except that roller 304, with momentary reference to FIG. 4, is replaced with roller 303. In this regard, cable 610 may extend between first cable attachment member 126 and second cable attachment member 128, via cable guidance system 680. Flexible tensioning system 600 may be coupled between first fan cowl 121, forward edge 168, with momentary reference to FIG. 3, of fairing 160, and second fan cowl 122. Cable 310 may extend from first cable attachment member 126, radially outward of roller 301, radially outward of roller 303, radially outward of roller 302, and to second cable attachment member 128.

Figure 7A:
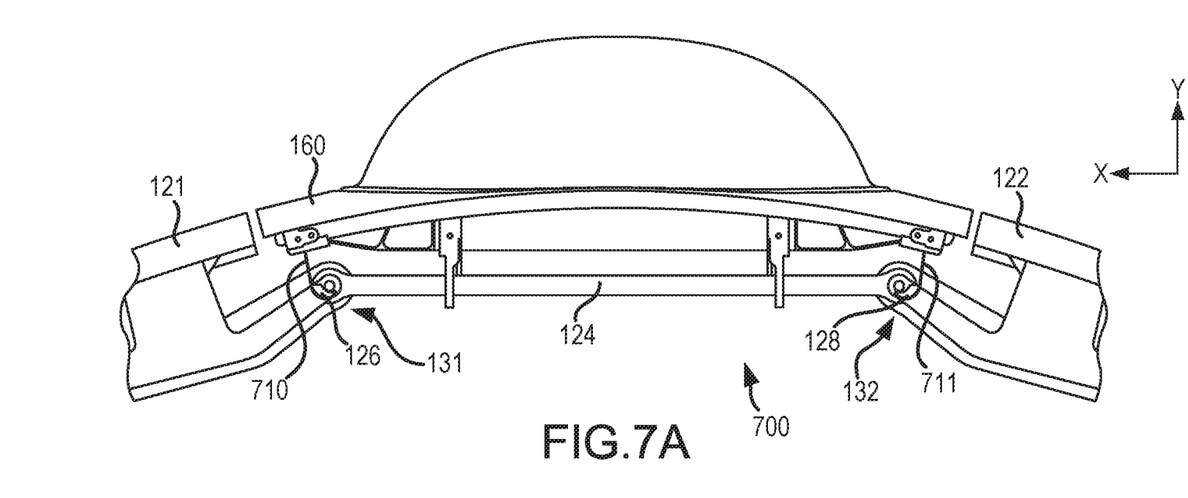
FIG. 7A illustrates a cross-section axial, forward looking aft, view of a flexible tensioning system coupled between the first fan cowl, the fairing, and the second fan cowl, in accordance with various embodiments.

With reference to FIG. 7A, a flexible tensioning system 700 is illustrated, in accordance with various embodiments. Flexible tensioning system 700 may comprise a cable (also referred to herein as a first cable) 710 coupled between fairing 160 and first fan cowl 121. Flexible tensioning system 700 may comprise a cable (also referred to herein as a second cable) 711 coupled between fairing 160 and second fan cowl 122.

Figure 7B:
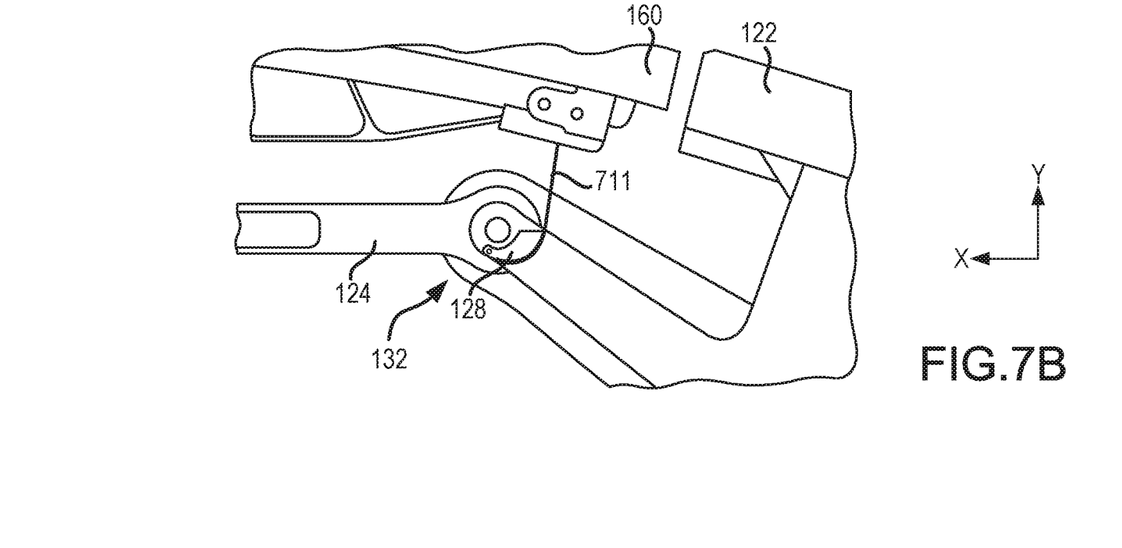
FIGS. 7B-7D illustrate a portion of the flexible tensioning system of FIG. 7A, with the second fan cowl in a closed position, in accordance with various embodiments.
Figure 7C:
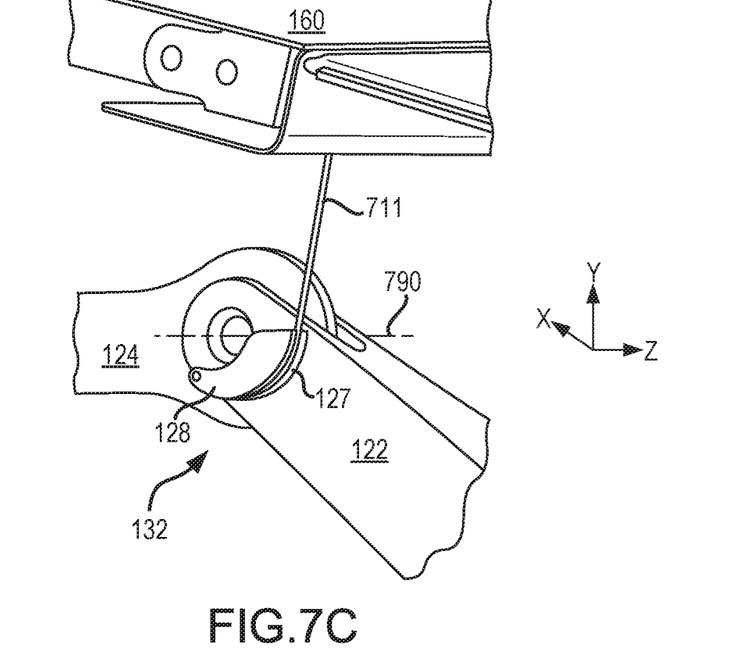
Figure 7D:
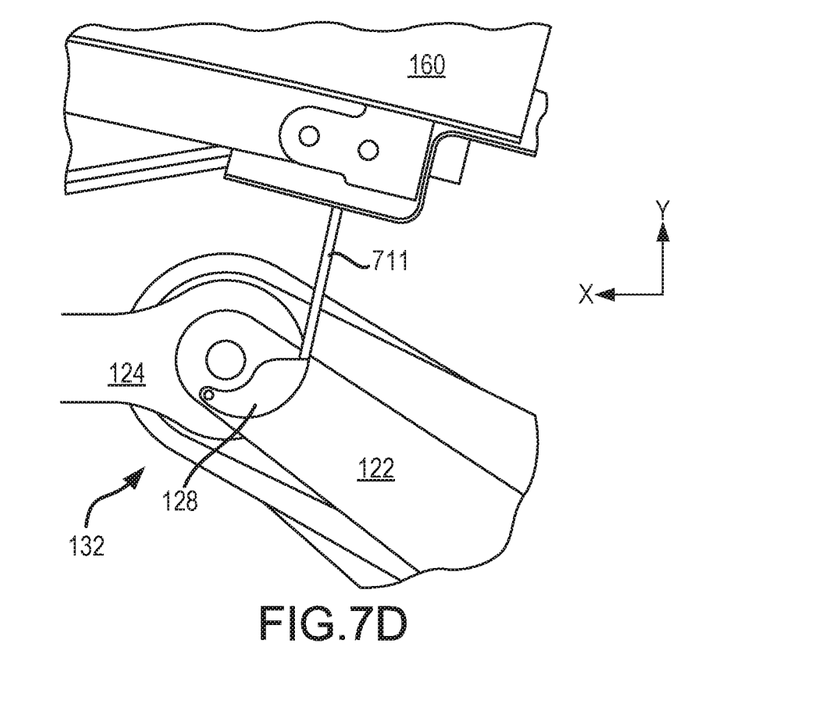

With reference to FIGS. 7B, 7C, and 7D, second fan cowl 122 is illustrated in a closed position. Flexible tensioning system 700 may be pre-tensioned in response to first fan cowl 121 and/or second fan cowl 122 moving to a closed position. Fairing 160 may be pre-tensioned via flexible tensioning system 700. Cable 710 may provide tension between fairing 160 and first fan cowl 121 in response to first fan cowl 121 rotating to and/or being in a closed position, with momentary reference to FIG. 7A. Cable 711 may provide tension between fairing 160 and second fan cowl 122 in response to second fan cowl 122 rotating to and/or being in a closed position. With momentary reference to FIG. 4 and FIG. 6, cable 310 may provide tension between fairing 160, first fan cowl 121, and second fan cowl 122, in response to first fan cowl 121 and/or second fan cowl 122 moving to a closed position. In various embodiments, cable 310 may provide tension between fairing 160, first fan cowl 121, inlet 110 (see FIG. 5), and second fan cowl 122, in response to first fan cowl 121 and/or second fan cowl 122 moving to a closed position.

With reference to FIGS. 7B, 7C, and 7D, cable 711 may wrap around outer surface 127 of second cable attachment member 128, in response to second fan cowl 122 moving to a closed position. Second fan cowl 122 may rotate about hinge axis 790. With momentary reference to FIG. 7A, cable 710 may be operatively coupled to first fan cowl 121 in a manner similar to cable 711 and second fan cowl 122. Further, with momentary reference to FIG. 4, first end 311 of cable 310 may be configured to wrap around first cable attachment member 126 in response to first fan cowl 121 moving to a closed position, and second end 312 of cable 310 configured to wrap around second cable attachment member 128 in response to the second fan cowl 122 moving to a closed position.

Figure 7E:
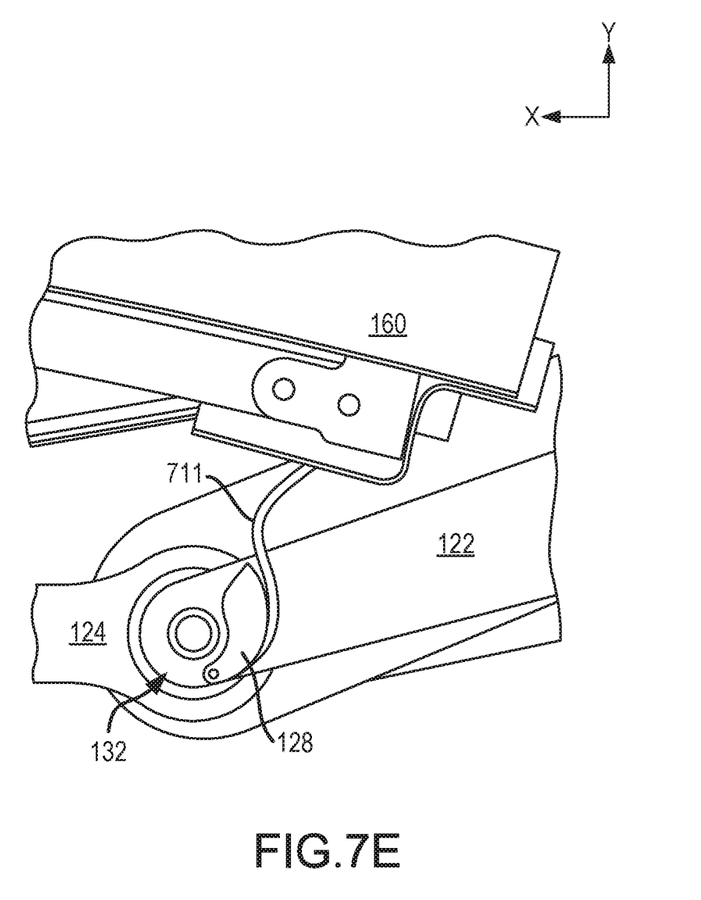
FIG. 7E illustrates a portion of the flexible tensioning system of FIG. 7A, with the second fan cowl in an open position, in accordance with various embodiments.

With reference to FIG. 7E, second fan cowl 122 is illustrated in an open position. Cable 711 may lose tension in response to second fan cowl 122 rotating to the open position. Cable 711 may at least partially unwrap from around second cable attachment member 128 in response to second fan cowl 122 rotating to the open position. In this regard, the length of cable 711 may be adjusted such that cable 711 is under tension in response to second fan cowl 122 rotating to the closed position and is loose in response to second fan cowl 122 rotating to the open position.

Figure 8:
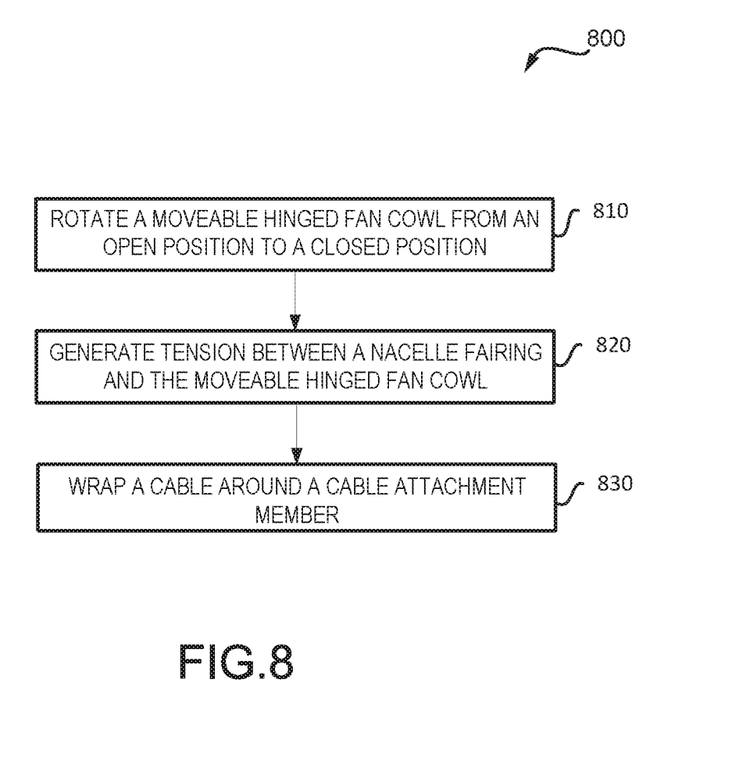
FIG. 8 illustrates a method for restraining a forward edge of a nacelle fairing, in accordance with various embodiments.

With reference to FIG. 8, a method 800 for restraining a forward edge of a nacelle fairing is illustrated, in accordance with various embodiments. Method 800 includes rotating a fan cowl from an open position to a closed position (step 810). Method 800 includes generating tension between the nacelle fairing and the fan cowl (step 820). Method 800 includes wrapping a cable around a cable attachment member (step 830).

With combined reference to FIG. 8 and FIG. 4, step 810 may include rotating first fan cowl 121 from an open position to a closed position. Step 810 may include rotating second fan cowl 122 from an open position to a closed position. Step 820 may include generating tension, via flexible tensioning system 300, between fairing 160 and first fan cowl 121, in response to rotation of first fan cowl 121 to a closed position. Similarly, step 820 may include generating tension, via flexible tensioning system 300, between fairing 160 and second fan cowl 122, in response to rotation of second fan cowl 122 to a closed position. Step 820 may include generating tension, via flexible tensioning system 600 or via flexible tensioning system 700, with momentary reference to FIG. 6 and FIG. 7A. Step 830 may include wrapping cable 310 around first cable attachment member 126 or second cable attachment member 128 in response to rotation of first fan cowl 121 or rotation of second fan cowl 122, respectively.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A nacelle tensioning arrangement comprising:
a fairing located between a first fan cowl and a second fan cowl, and
a tensioning system comprising:
a first cable attachment member configured to be coupled to the first fan cowl; and
a cable configured to be extended between the first cable attachment member and the fairing;
wherein the first cable is configured to restrain at least a portion of the fairing from moving in a radial direction in response to at least one of the first fan cowl and the second fan cowl being in a closed position.

2. The nacelle tensioning arrangement of claim 1, wherein the tensioning system further comprises:
a cable guidance system; and
a second cable attachment member.

3. The nacelle tensioning arrangement of claim 2, wherein the second cable attachment member is configured to be coupled to the second fan cowl,
the cable guidance system is configured to be coupled to a forward edge of the fairing via a hinge beam stirrup, and
the cable is configured to extend between the first cable attachment member and the second cable attachment member, via the cable guidance system.

4. The nacelle tensioning arrangement of claim 3, wherein an aft edge of the fairing is mounted to a pylon.

5. The nacelle tensioning arrangement of claim 4, wherein a first end of the cable is coupled to the first cable attachment member and a second end of the cable is coupled to the second cable attachment member,
the first end of the cable configured to wrap around the first cable attachment member in response to the first fan cowl moving to the closed position, and
the second end of the cable configured to wrap around the second cable attachment member in response to the second fan cowl moving to the closed position.

6. The nacelle tensioning arrangement of claim 5, wherein the cable guidance system comprises a plurality of rollers coupled to the forward edge of the fairing.

7. The nacelle tensioning arrangement of claim 6, wherein the cable guidance system further comprises a roller coupled to an aft edge of a nacelle inlet and located radially inward from the plurality of rollers coupled to the forward edge of the fairing.

8. The nacelle tensioning arrangement of claim 1, wherein the tensioning system further comprises:
a second cable;
the first cable attachment member coupled to a first hinge of the first fan cowl; and
a second cable attachment member coupled to a second hinge of the second fan cowl,
wherein the cable is coupled between the first cable attachment member and the fairing, and the second cable is coupled between the second cable attachment member and the fairing.

9. A nacelle for a turbine engine comprising:
a first fan cowl;
a second fan cowl;
a fairing located between the first fan cowl and the second fan cowl; and
a tensioning system comprising a cable;
the cable is coupled between the first fan cowl, a forward edge of the fairing, and the second fan cowl,
wherein the cable provides tension between the first fan cowl, the forward edge of the fairing, and the second fan cowl.

10. The nacelle of claim 9, wherein the cable provides the tension in response to at least one of the first fan cowl and the second fan cowl rotating to a closed position, and the cable loses tension in response to at least one of the first fan cowl and the second fan cowl rotating to an open position.

11. The nacelle of claim 10, wherein an aft edge of the fairing is mounted to a pylon.

12. The nacelle of claim 11, wherein the tensioning system further comprises:
a cable guidance system;
a first cable attachment member; and
a second cable attachment member.

13. The nacelle of claim 12, wherein
the first cable attachment member is configured to be coupled to the first fan cowl and the second cable attachment member is configured to be coupled to the second fan cowl,
the cable guidance system is configured to be coupled to the forward edge of the fairing, and
the cable is configured to extend between the first cable attachment member and the second cable attachment member, via the cable guidance system.

14. The nacelle of claim 13, wherein a first end of the cable is coupled to the first cable attachment member and a second end of the cable is coupled to the second cable attachment member,
the first end of the cable configured to wrap around the first cable attachment member in response to the first fan cowl moving to the closed position, and
the second end of the cable configured to wrap around the second cable attachment member in response to the second fan cowl moving to the closed position.

15. The nacelle of claim 14, wherein the cable guidance system comprises a plurality of rollers coupled to the forward edge of the fairing.

16. The nacelle of claim 15, further comprising a nacelle inlet located forward of the fairing, the first fan cowl, and the second fan cowl.

17. The nacelle of claim 16, wherein the cable guidance system further comprises a roller coupled to an aft edge of the nacelle inlet, the roller located radially inward from the plurality of rollers coupled to the forward edge of the fairing.

18. The nacelle of claim 9, wherein the tensioning system comprises:
a first cable;
a second cable;
a first cable attachment member coupled to the first fan cowl; and
a second cable attachment member coupled to the second fan cowl,
wherein the first cable is coupled between the first cable attachment member and the fairing,
and the second cable is coupled between the second cable attachment member and the fairing.

19. A method for restraining a forward edge of a nacelle fairing comprising:
rotating a fan cowl from an open position to a closed position; and
generating tension, via a cable of a tensioning system, between the nacelle fairing and the fan cowl, in response to the rotation.

20. The method of claim 19, further comprising:
wrapping the cable around a cable attachment member in response to the rotation, the tensioning system comprising the cable, and the cable attachment member coupled to a hinge of the fan cowl.

* * * * *